(12) United States Patent  (10) Patent No.: US 8,870,197 B2
John  (45) Date of Patent: Oct. 28, 2014

(54) AUTO TUG

(76) Inventor: Sekora John, Sparks, NV (US)

( * ) Notice: Subject to any disclaimer, the term of this patent is extended or adjusted under 35 U.S.C. 154(b) by 0 days.

(21) Appl. No.: 13/308,488

(22) Filed: Nov. 30, 2011

(65) Prior Publication Data

US 2013/0134685 A1  May 30, 2013

(51) Int. Cl.
*B60S 13/00* (2006.01)
*B60S 13/02* (2006.01)

(52) U.S. Cl.
CPC . *B60S 13/00* (2013.01); *B60S 13/02* (2013.01)
USPC ........... 280/79.4; 414/429; 414/444; 414/463

(58) Field of Classification Search
USPC ........................ 280/79.4; 414/429, 444, 463
See application file for complete search history.

(56) References Cited

U.S. PATENT DOCUMENTS

| 4,872,694 | A | * | 10/1989 | Griesinger | .................. 280/79.4 |
| 6,055,880 | A | * | 5/2000 | Gogovitza | ..................... 74/349 |
| 7,278,647 | B1 | * | 10/2007 | Keenan et al. | ............. 280/79.11 |
| 7,334,804 | B2 | * | 2/2008 | Mitchell et al. | ............. 280/79.4 |
| 7,845,655 | B2 | * | 12/2010 | Lawson et al. | ............... 280/79.4 |
| 2007/0182115 | A1 | * | 8/2007 | Groomes | .................... 280/79.4 |

* cited by examiner

*Primary Examiner* — J. Allen Shriver, II
*Assistant Examiner* — Hilary L Johns
(74) *Attorney, Agent, or Firm* — Mark A. Goodman, Esq.

(57) ABSTRACT

An apparatus for lifting and moving an inoperative vehicle is disclosed. The invention includes a horizontal rigid platform having a front side, a back side, a left side, a right side, a top surface and a bottom surface. The apparatus includes a first tire roller supported on a left protruded portion extending from the front side and a second tire roller supported on a right protruded portion extending from an adjustable lower plate. The electric motor is operated using a controller to lift a vehicle wheel off the ground. The apparatus utilizes a plurality of casters attached to the horizontal rigid platform to move the vehicle in desired direction.

12 Claims, 4 Drawing Sheets

AUTO TUG

FIELD OF THE INVENTION

The present invention relates generally to the field of apparatuses for lifting and moving vehicles. More particularly, the present invention relates to an apparatus for automatically lifting and moving vehicles inside a workshop or between auto auction stages without applying much physical effort.

BACKGROUND

Several types of apparatuses for lifting and moving vehicles are used in places where the vehicle cannot be moved utilizing its own power.

There are situations where manually lifting and moving the vehicle may be difficult and time consuming. The process may include a lot of physical effort as the vehicle may weigh many tons. Also in auto auctions, moving the vehicle between the stages cannot be done manually as it may damage the expensive body paint and it can be difficult to move the vehicle in the desired direction.

Presently a wide variety of apparatuses for lifting and moving vehicles are available in the market. These apparatuses can be employed for lifting and moving different kinds of vehicles. These apparatuses may require an operator to continuously adjust a lever to lift the vehicle. These types of lifting and moving apparatuses have wheels or castors for moving the vehicle easily. The conventional apparatus may lift the vehicle and the vehicle then has to be manually pushed for moving inside a garage or other building. The conventional lifting and moving apparatuses are only useful for moving the vehicle in a forward and backward direction, not for moving vehicles from side-to-side.

The conventional portable dolly apparatus for transporting a vehicle may include a lifting arm or a lever which has to be controlled manually. The lifting mechanism incorporated with the apparatus may be a hydraulic jack, which requires an operator to operate the hydraulic jack to lift the vehicle. But the hydraulic systems employed in the apparatus may not be suitable for lifting and holding up the vehicle for a significant length of time. In order to move or transport the vehicle in a desired direction the operator has to manually change the position by applying a small force. This may increase the chances of getting scratches or dirt on the expensive body paint of the vehicles placed in an auction. Moreover the apparatus may require more than one operator to move the vehicle. Therefore there is a need for an apparatus or a device which would minimize manual intervention and the physical effort required in moving the vehicle. Further, such an apparatus could be operated by utilizing an automatic controller.

Therefore there exists a need for a vehicle lifting and moving apparatus having wheels or castors that allows an operator to move a vehicle with ease in any direction. The needed device would also limit the chances of placing hands on the body of the vehicle while moving it in a desired direction and eliminates the need for raising the vehicle off the ground before placing the apparatus under the vehicle. The needed device would also incorporate an automatic controller for lifting and moving the vehicle in a desired direction.

SUMMARY OF PREFERRED EMBODIMENT OF THE INVENTION

Advantages of one or More Embodiments of the Present Invention

The various embodiments of the present invention may, but do not necessarily, achieve one or more of the following advantages:

The ability to lift and move a vehicle in any direction in a short period of time without much physical effort by an operator.

The ability to use the apparatus for lifting and moving a wide variety of vehicles.

The ability to carry the apparatus to the desired location as it is portable.

The ability to lift and move the vehicle utilizing an automatic controller.

The ability to control the movement of the apparatus either by sitting inside the vehicle or by standing outside.

These and other advantages may be realized by reference to the remaining portions of the specification, claims, and abstract

BRIEF DESCRIPTION OF PREFERRED EMBODIMENT OF THE PRESENT INVENTION

In preferred embodiment, apparatus for lifting and moving an inoperative vehicle comprises a horizontal rigid platform having a front side, a back side, a left side, a right side, a top surface and a bottom surface. A lower plate is placed under the horizontal rigid platform. A left protruded portion extends from a left end of the front side and a right protruded portion extends from the lower plate. A first tire roller and a second tire roller having a first end and a second end are supported on the left protruded portion and the right protruded portion respectively. The first tire roller and the second tire roller are provided with a coarse grit on an outer surface. A vehicle wheel guide is attached to the first end and the second end of the first tire roller and the second tire roller. A first elongated shaft is attached to the second end of the first tire roller. A second elongated shaft is attached to the second end of the second tire roller. A plurality of fixing means holds the first elongated shaft and the second elongated shaft in position. An electric power supply device chargeable from a battery charger is placed on the top surface. The battery charger is provided with a charger access receptacle for receiving power from an external power supply. An electric motor having a threaded shaft is fixed on the top surface. A gear means comprises of a worm wheel and the threaded shaft. A coupling means comprises of a gear wheel and a chain. A first joining means connects the gear wheel to a second joining means. A tension adjustment handle having a link is pivoted at the top surface for moving the lower plate. A plurality of castors is attached to the bottom portion. A top sheet covers the horizontal rigid platform.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

Figure 1:
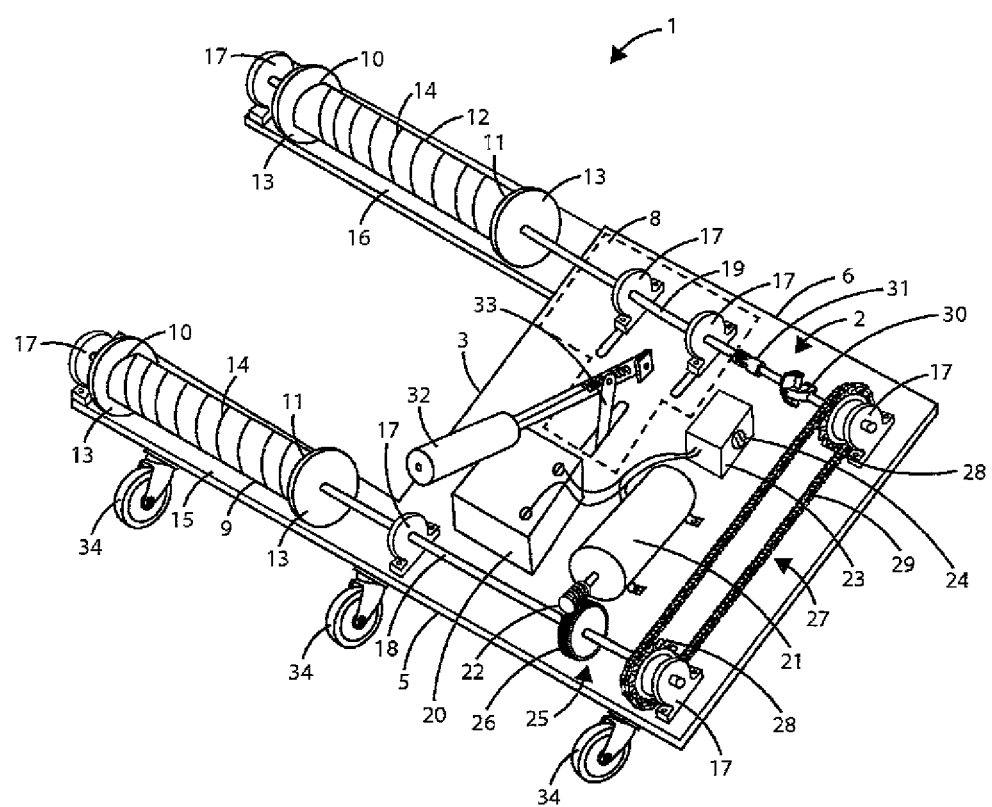
FIG. 1 is substantially a perspective view of the preferred embodiment of the present invention.
Figure 2:
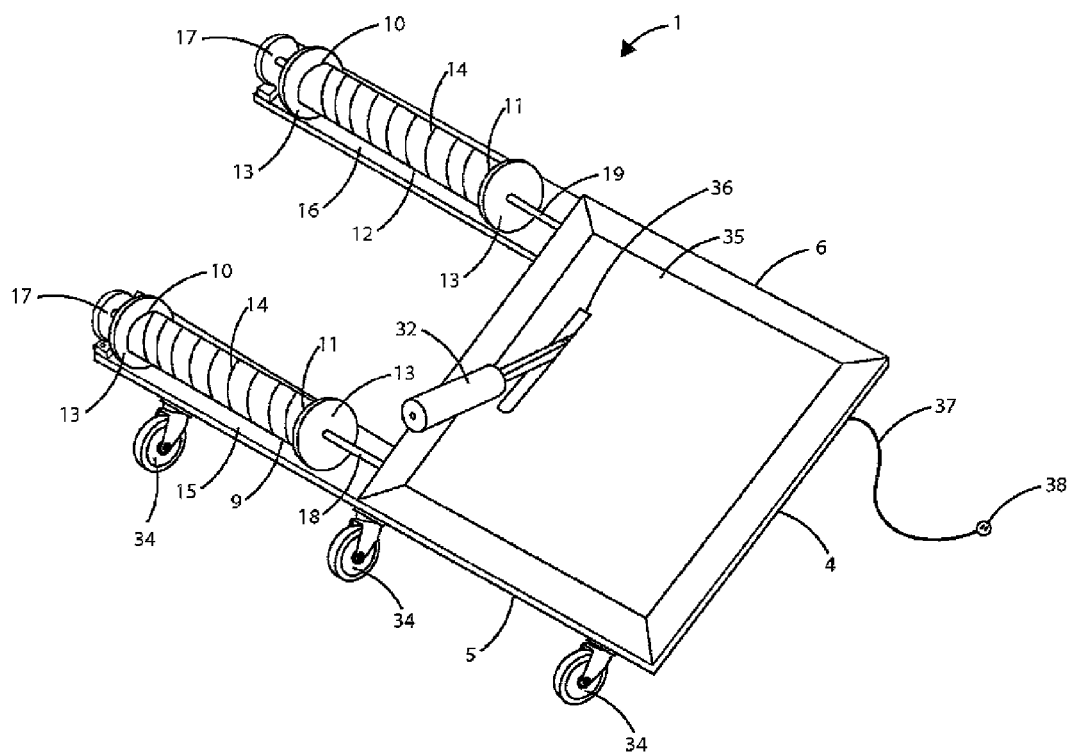
FIG. 2 is substantially a perspective view of the preferred embodiment of the present invention with a top cover.
Figure 3:
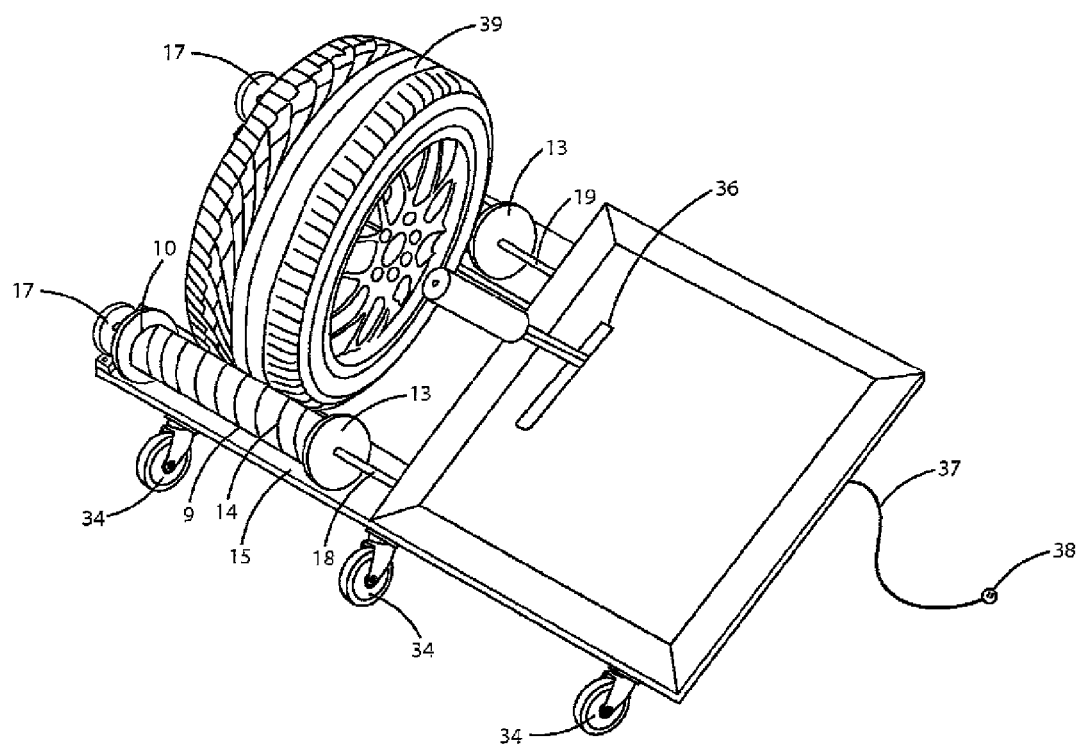
FIG. 3 is substantially a perspective view of the preferred embodiment of the present invention in use.
Figure 4:
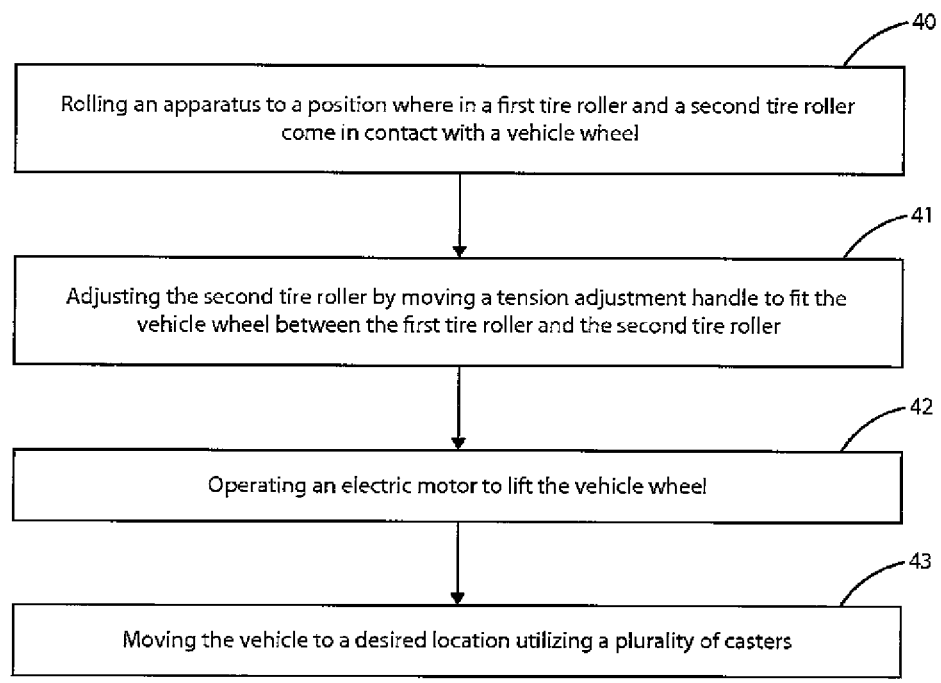
FIG. 4 is a flow chart illustrating the working of the preferred embodiment of the present invention.

In the following detailed description of the preferred embodiment, reference is made to the accompanying drawings, which from a part of this application. The drawings show, by way of illustration, specific embodiments in which the invention may be practiced. It is to be understood that other embodiments may be utilized and structural changes may be made without departing from the scope of the present invention.

The following is a listing of the reference numbers included in the original drawings and the element that each reference number corresponds to and a brief description:

Horizontal rigid platform: The apparatus 1 for moving an inoperative vehicle having a horizontal rigid platform 2 which comprises a front side 3, a back side 4, a left side 5, a right side 6, a top surface 7 and a bottom surface (not shown) in accordance with preferred embodiment of the present invention.

Lower Plate: The lower plate 8 placed under the horizontal rigid platform 2 is adjustable to move along the horizontal rigid platform 2.

First tire roller: The first tire roller 9 having a first end 10, a second end 11, a wheel guide 13 attached to the first end 10 and the second end 11 and a coarse grit 14 provided on an outer surface.

Second tire roller: The second tire roller 12 having a first end 10, a second end 11, a wheel guide 13 attached to the first end 10 and the second end 11 and a coarse grit 14 provided on an outer surface.

Plurality of fixing means: The plurality of fixing means 17 rotatably holds a first elongated shaft 18 and a second elongated shaft 19 in position.

Electric power supply device: The electric power supply device 20 for powering an electric motor 21 mounted on the top surface 7.

Gear means: The gear means interconnects the electric motor 21 and the first elongated shaft 18 to transfer the rotation.

Coupling means: The coupling means 27 for connecting the first elongated shaft 18 to the second elongated shaft 19.

First joining means: The first joining means 30 connects the coupling means 27 to a second joining means 31.

Tension adjustment handle: The tension adjustment handle 32 pivotally fixed to the horizontal rigid platform 2 and to the lower plate 8 using a link 33.

Plurality of casters: The plurality of casters 34 connected to the bottom portion for moving the apparatus 1.

Top sheet: The top sheet 35 covering the top surface 7 of the horizontal rigid platform 2.

The present invention comprises an apparatus 1 for lifting and moving an inoperative vehicle. The apparatus 1 includes a horizontal rigid platform 2 having a front side 3, a back side 4, a left side 5, a right side 6, a top surface 7 and a bottom surface (not shown) in accordance with the preferred embodiment of the present invention. A lower plate 8 is placed under the horizontal rigid platform 2. The lower plate 8 is adjustable to move along the horizontal rigid platform 2. A left protruded portion 15 extends from left end of the front side 3 and a right protruded portion 16 extends from the lower plate 8. A first tire roller 9 having a first end 10 and a second end 11 is cylindrical in shape. A second tire roller 12 having the same shape and size of the first tire roller 9 is supported on the right protruded portion 16. The first tire roller 9 and the second tire roller 12 are provided with a coarse grit 14 on an outer surface of the cylindrical body. A vehicle wheel guide 13 is attached to the first end 10 and the second end 11 of the first tire roller 9 and the second tire roller 12. A first elongated shaft 18 is attached to the second end 11 of the first tire roller 9. A second elongated shaft 19 is attached to the second end 11 of the second tire roller 12. A plurality of fixing means 17 holds the first elongated shaft 18 and the second elongated shaft 19 in position. An electric power supply device 20 chargeable from a battery charger 23 is placed on the top surface 7. The battery charger 23 is provided with a charger access receptacle 24 for receiving power from an external power supply (not shown). An electric motor 21 having a threaded shaft 22 is fixed on the top surface 7. A gear means 25 comprising of a worm wheel 26 and the threaded shaft 22. A coupling means 27 comprises of a gear wheel 28 and a chain 29. A first joining means 30 connects the gear wheel 28 to a second joining means 31. A tension adjustment handle 32 having a link 33 is pivoted at the top surface 7 for moving the lower plate 8. A plurality of castors 34 is attached to the bottom portion (not shown). A top sheet 35 covers the horizontal rigid platform 2.

The apparatus 1 may be employed for lifting and moving different kinds of inoperative vehicles around a garage or between auto auction stages. The horizontal rigid platform 2 in rectangular shape may be made of steel sheet having at least ¼" thickness to safely support all the components of the apparatus 1. The lower plate 8 placed below the horizontal rigid platform 2 is made up of steel sheet. By adjusting the tension adjustment handle 32 the position of the lower plate 8 can be changed by an operator to fit with the vehicle wheel 39 width.

The left protruded portion 15 extends from left end of the front side 3 may be made of steel sheet and kept as low as possible. The right protruded portion 16 is extending from the lower plate 8 and may have the same level and length as that of the left protruded portion 15 as that of the horizontal rigid platform 2. The first tire roller 9 supported on the left protruded portion 15 is cylindrical in shape. The coarse grit 14 provided on the cylindrical outer surface may help in lifting the vehicle wheel 39 since it provides more grip. The wheel guide 13 attached to the first end 10 and the second end 11 of the first tire roller 9 and the second tire roller 12 may be a circular disc. The wheel guide 13 prevents the vehicle wheel 39 from rolling out of the apparatus 1 while lifting and moving. The first ends 10 of the first tire roller 9 and the second tire roller 12 are rotatably fixed to the left protruded portion 15 and the right protruded portion 16 utilizing the fixing means 17. The first elongated shaft 18 and the second elongated shaft 19 may be a steel shaft of ½" diameter and is fixed to a center of the wheel guides 13.

The electric power supply device 20 may be a battery consisting of a plurality of 12V lithium cells. The electric motor 21 may be a starter motor powered from the electric power supply device 20. The electric motor 21 may be a reversible motor capable to operate at variable speed. The safe speed of operation of the electric motor 21 may be the speed of a slow walk.

The electric motor 21 may be started using a motor controller (not shown). The center of the worm wheel 26 is fixed to the first elongated shaft 18. The threaded shaft 22 may engage with the worm wheel 26 of the gear means 25 to transfer the rotation o the electric motor 21 to the first elongated shaft 18. The gear means 25 may be a worm drive. The coupling means 27 of the apparatus 1 may be a sprocket comprising the chain 29 having at least ½" width and the gear wheels 28. The chain 29 transfers the rotation of the first elongated shaft 18 to the second elongated shaft 19 which in turn rotates the first tire roller 9 and the second tire roller 12 in the same direction.

The first joining means 30 of the apparatus 1 may be a sliding slip joint connecting the sprocket to a second joining means 31, wherein the second joining means may be a universal joint. The universal joint allows the second elongated shaft 19 to bend in any direction. Thus the second elongated shaft 19 may move along with the movement of the lower plate 8 and at the same time transmitting the rotary motion. While moving the tension adjustment handle 32 the joint operation of the link 33 and the pivoted end forces the lower plate 8 to move in a particular direction. Thereby the apparatus can be utilized to lift and move the vehicle with different kinds of wheel widths.

A top sheet 35 covering the horizontal rigid platform 2 may be provided with an opening 36 to allow the movement of the tension adjustment handle 32. An electric wire 37 having a plug 38 provided at the end connects the battery charger 23 to the external power source. The motor controller (not shown) may be wired/wireless type which allows the operator to control the working of the apparatus 1. The plurality of castors 34 supporting the apparatus 1 are free to move in any direction. After lifting the vehicle wheel the apparatus 1 can be easily moved in the desired direction. The apparatus 1 may be used on any of the four wheels of the vehicle but recommended on either rear wheel to provide vehicle propulsion in either direction. The apparatus 1 can be effectively utilized to move the vehicle from side to side.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

The invention claimed is:

1. A portable apparatus for moving a vehicle across an area of ground comprising: a. a horizontal rigid platform having a front side, a back side, a left side, a right side, a top surface and a bottom surface; b. a lower plate placed under the horizontal rigid platform; c. a first tire roller having a first end and a second end rotatably supported on a left protruded portion extending from a left end of the front side; d. a second tire roller having a first end and a second end rotatably supported on a right protruded portion extending from the lower plate; e. a plurality of fixing means placed on the top surface to rotatably hold a first elongated shaft and a second elongated shaft; f. an electric power supply device for powering an electric motor coupled with the apparatus; g. a gear means interconnecting the electric motor and the first elongated shaft; h. a coupling means for connecting the first and elongated shaft to the second elongated shaft; i. a first joining means connecting the coupling means to a second joining means; j. a tension adjustment handle pivotally fixed to the horizontal rigid platform; k. wherein the electric motor is configured to rotate the first tire roller and the second tire roller resulting in lifting of the vehicle thereafter moving the vehicle; l. the horizontal rigid platform is supported by a plurality of casters; m. the lower plate is adjustable to move along the horizontal rigid platform; n. the first tire roller supported on the left protruded portion has a coarse grit on the outer surface; o. the second tire roller with the coarse grit on the outer surface is supported on the right protruded portion; p. the first tire roller and the second tire roller include a wheel guide on the first end and the second end; q. the first tire roller and second tire roller have a cylindrical body; r. the first tire roller and the second tire roller rotate about an axis passing through a center of the cylindrical body; s. the apparatus is configured to move the vehicle through rotation of a single tire of the vehicle; t. movement of the vehicle is accomplished when the apparatus is positioned so that the first and second tire rollers straddle the single tire of the vehicle; u. the electric motor powers rotation of the tire rollers in a desired direction thereby rotating the tire in the desired direction along the ground; v. the single tire remains in contact with the ground throughout the movement of the vehicle.

2. The apparatus of claim 1 wherein the gear means comprises a worm gear drive comprising the threaded shaft and a worm wheel.

3. The apparatus of claim 2 wherein the first elongated shaft passes through a center of the worm wheel.

4. The apparatus of claim 1 wherein the coupling means comprises a sprocket.

5. The apparatus of claim 4 wherein the sprocket comprises a first gear wheel, a second gear wheel and a chain.

6. The apparatus of claim 4 wherein the sprocket rotates the first elongated shaft and the second elongated shaft.

7. The apparatus of claim 1 wherein the first joining means comprises a sliding slip joint.

8. The apparatus of claim 7 wherein the sliding slip joint transfers rotation from the sprocket to the second coupling means.

9. The apparatus of claim 1 wherein the joining means comprises a universal joint.

10. The apparatus of claim 9 wherein the universal joint is connected to the second elongated shaft.

11. The apparatus of claim 1, wherein the tension adjustment handle is configured to slide the lower plate.

12. A method of moving an inoperative vehicle utilizing an apparatus, the method comprising the steps of:
 a. providing the apparatus of claim 1;
 b. rolling the apparatus to a position wherein a first tire roller and a second tire roller come in contact with a vehicle wheel;
 c. adjusting the second tire roller by moving a tension adjustment handle to fit the vehicle wheel between the first tire roller and the second tire roller;
 d. operating an electric motor to lift the vehicle wheel; and
 e. moving the vehicle to a desired location utilizing a plurality of casters.

* * * * *